Patented Aug. 5, 1952

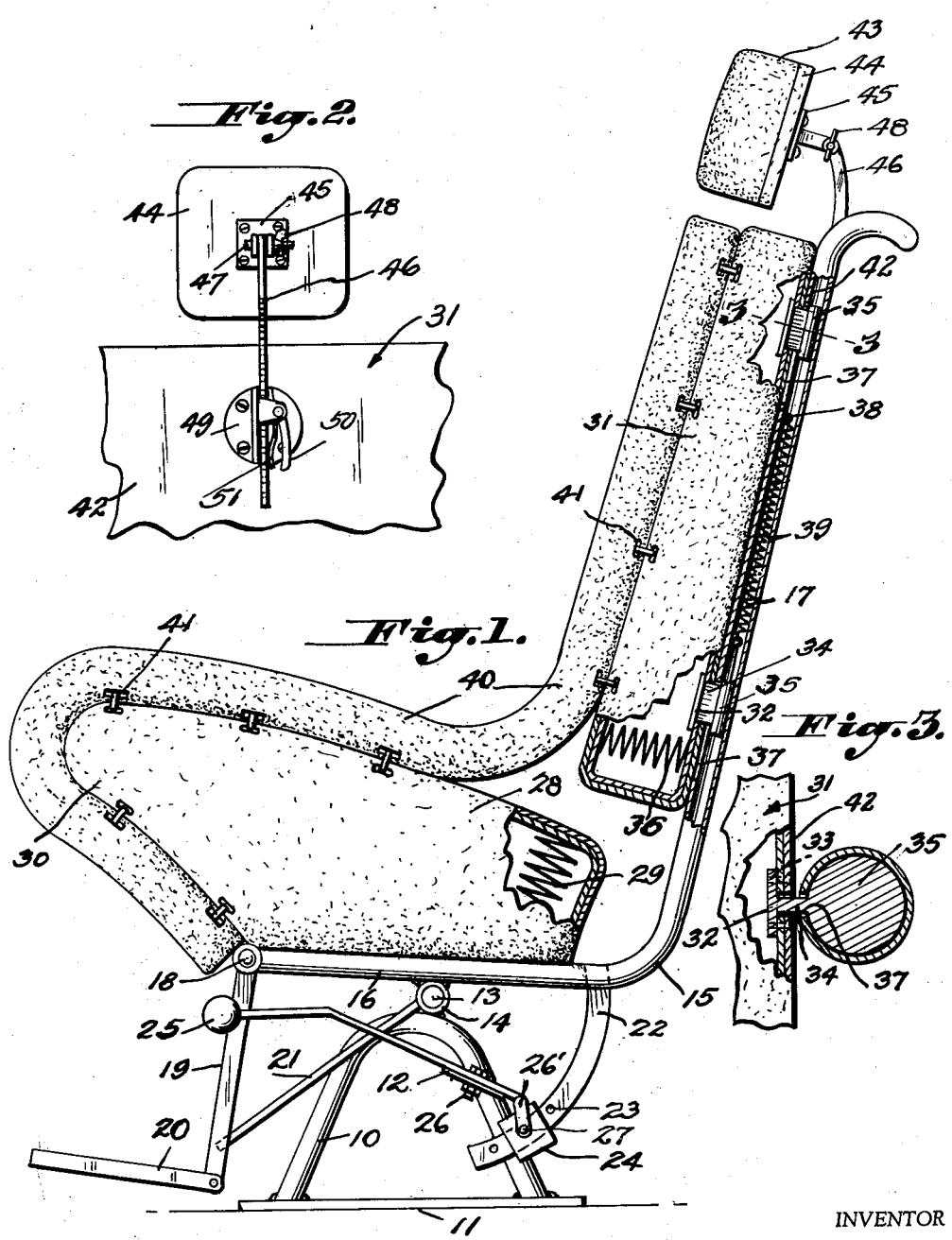

2,605,813

UNITED STATES PATENT OFFICE 2,605,813

ROCKABLE UPHOLSTERED VEHICLE SEAT

Franz Xaver Seitz, Kreuzlingen, Switzerland

Application April 6, 1945, Serial No. 586,916
In Switzerland September 19, 1944

2 Claims. (Cl. 155—53)

This invention relates to a rockable upholstered seat for vehicles, particularly for motor busses.

The seats that up to the present time have been used on motor busses have the drawback that the passenger becomes tired during a long drive. This is due to the fact that the angular position of the back of the seat cannot be changed at will and the body of the passenger is subjected to continuous vibrations, according to the nature of the road. There is also the condition wherein the shocks of the motor bus are absorbed by the seat rest element alone while the back rest remains stationary and the relative movements of the seat rest with respect thereto produce tiring friction on the back of the passenger.

It is one object of the present invention to obviate the above stated drawbacks by providing a rockable upholstered seat for motor busses, which seat can be latched in any one of several selected positions.

It is another object of the present invention to provide an upholstered seat and back which are interconnected so that the back rest moves with the seat rest in absorbing the shocks from the motor bus.

Still further objects, advantages and improvements will become apparent from the following specification, taken in connection with the accompanying drawings in which:

Figure 1 is a side elevation view of a motor vehicle seat according to the present invention with certain parts being shown in section to illustrate the yieldable mounting for the back rest;

Figure 2 is a rear elevation view showing the mounting for the head rest; and,

Figure 3 is a detail view on the section line 3—3 of Figure 1 showing a detail of the mounting means of the back rest on the back of the seat.

Referring now to the drawings in detail, and to Figure 1 in particular, the rockable upholstered seat according to the present invention is here shown as mounted on an inverted substantially V-shaped bottom frame 10 which is secured to a plate 11 adapted to be in turn secured to the floor of the motor bus in any suitable manner (not shown). A substantially L-shaped frame 15 of tubular construction extends for the width of the seat and has a bottom 16 on which there are secured bearing sleeves 14 which receive a rod 13 mounted on the bottom frame 10. At the forward end of the bottom 16 of the seat frame a foot rest is provided comprised by a platform 20 suspended by bars 19 from a bar 18 extending transversely of the seat frame. A re-enforcing brace 21 is provided between the bars 19 and the bearing sleeves 14.

Suitable means are provided for adjusting the bottom and back of the seat into one of several desired angular positions. An arcuate bar 22 extends downwardly from the bottom 16 of the seat and transversely of the rear leg of the bottom frame 10, and has longitudinally spaced holes 23—23 therein. This arcuate bar is slidably mounted in a sleeve 24 which latter is fixed on the frame 10. A plate 12 is mounted on the bottom frame 10 and on this plate a lever 25 is pivotally mounted by a bolt 26. The lever 25 extends forwardly and terminates adjacent the bars 19 which support the platform 20. At its inner end the lever 25 carries an arm 26' having a pin 27 thereon. The pin 27 passes through a hole (not shown) in the sleeve 24 and may be inserted by oscillating the lever 25 into any one of the spaced holes 23—23 in the arcuate bar 22 to thereby secure the seat frame 15 in any one of several selected angular positions.

On the bottom 16 of the chair frame there is placed a seat cushion 28 which in known manner is a totally enclosed structure having top, bottom, ends and sides and being suitably upholstered at least on the top, ends and sides. Compression springs 29 are mounted at spaced locations within the seat cushion and between the top and the bottom. The particular type of seat cushion here illustrated has an overhanging forward section 30 which is downwardly and inwardly curved on its under side.

The tubular members forming the seat frame 15 extend upwardly and are disposed rearwardly at 17. The back rest 31 is slidably and resiliently mounted on the tubular members 17. The back rest is likewise a totally enclosed structure having top, bottom, ends and sides and being suitably upholstered at least on the top, ends and sides. Compression springs 36 are mounted at spaced locations within said back rest and between the top and bottom.

The back rest 31 is slideably secured to the tubular member 17 by lugs which have flanges 32 secured to the rear walls of the back rest by screws 33. These lugs have central web sections 34 which are slideably received in longitudinally extending slots 37 in the tubular member 17 and cylindrical ends 35 which are guided within the tubular member 17. A pin 38 is diametrically positioned adjacent the upper end of each tubular member 17 and a spring 39 is secured to the pin and connected to the cylindrical end 35 of the lower lug to resiliently mount the back rest 31 on the tubular members 17.

A pad 40 extends upwardly along the back rest 31 and is secured to the sides thereof by clips 41. This pad also extends along the top of the seat cushion 28 and around the overhanging end 30 of same and is also secured thereto by further clips 41. The pad 40 is also secured to the top of the seat cushion and the underface of the overhanging end 30 of same by clips 41. Thus the pad 40 interconnects the back rest 31 and the seat cushion 28 for angular movement during shocks imparted to the seat from the motor bus.

A head rest is secured to a back plate member 42 of the back rest 31. This head rest is comprised by a suitably upholstered pad 43 mounted on a back plate 44. A bracket 45 is mounted on the rear face of the back plate 44 and a curved bar 46 is angularly adjustably secured to this bracket by a bolt 47 and wing nut 48. The bar 46 extends downwardly along a vertical rib of a bracket 49 on the back member 42 and is adjustably clamped to this rib by a spring blade 51 operated by a hand lever 50.

Having now fully described my invention, what I claim as new and useful and desire to secure by Letters Patent of the United States is:

1. A rockable upholstered vehicle seat comprising a stationary seat supporting frame, an upper seat frame rockably mounted on said stationary supporting frame, a spring cushioned seat element mounted on said upper frame and adapted to yield to vertical shocks, a cushioned back element spring suspended from said upper frame for up and down sliding movement, a flexible pad connecting said seat and back elements together, said flexible pad adapting both said seat and back elements to yield conjointly to vertical shocks in a straight line, and means for locking said rockable upper frame in different angular positions without occupant leaving the seat.

2. A rockable upholstered vehicle seat comprising a stationary seat supporting frame, an upper seat frame including a back comprised of parallel upwardly extending tubes rockably mounted on said stationary seat supporting frame, a spring cushioned seat mounted on said upper seat frame and providing vertical yielding movement of the seating surface, an upholstered back element, tubular fittings slidably mounted in the said parallel upwardly extending tubes and secured to the back element for mounting same for vertical slidable movement, coil springs positioned within said parallel upwardly extending tubes and suspending the tubular fittings, a flexible pad secured to the back element and the spring cushioned seat along the sides thereof and inter-connecting same for upward and downward movement of the seat in correspondence with vertical movement of the back element, an upholstered head rest adjustably secured to the back element for conjoint vertical movement therewith, and lever means pivotally mounted on the seat supporting frame and operable by the occupant while seated for latching the upper seat frame and the spring cushioned seat thereon in any one of a plurality of selected positions.

FRANZ XAVER SEITZ.

REFERENCES CITED

The following references are of record in the file of this patent:

UNITED STATES PATENTS

| Number | Name | Date |
|---|---|---|
| 280,356 | Curtiss | July 3, 1883 |
| 516,110 | Pynchon | Mar. 6, 1894 |
| 703,227 | Blackard | June 24, 1902 |
| 1,132,387 | Robbins | Mar. 16, 1915 |
| 1,369,047 | Parker | Feb. 22, 1921 |
| 1,696,126 | Salmon | Dec. 18, 1928 |
| 1,722,543 | Selje | July 30, 1929 |
| 1,770,321 | Mougeotte | July 8, 1930 |
| 1,987,014 | Lampila et al. | Jan. 8, 1935 |
| 2,009,024 | Salmons | July 23, 1935 |
| 2,127,398 | Freeman | Aug. 16, 1938 |
| 2,152,024 | Brosset | Mar. 28, 1939 |
| 2,218,863 | Wagner | Oct. 22, 1940 |

FOREIGN PATENTS

| Number | Country | Date |
|---|---|---|
| 504,934 | Germany | Aug. 14, 1930 |